United States Patent
Allen et al.

(10) Patent No.: US 12,233,593 B2
(45) Date of Patent: Feb. 25, 2025

(54) ADDITIVE MANUFACTURE USING COMPOSITE MATERIAL ARRANGED WITHIN A MECHANICALLY ROBUST MATRIX

(71) Applicant: Vadient Optics, LLC, Beaverton, OR (US)

(72) Inventors: Thomas Leonard Allen, Eugene, OR (US); John Paul Harmon, Albany, OR (US); Samuel Peter Grimm, Philomath, OR (US); George Williams, Vashon, WA (US); Peter George Hugger, Eugene, OR (US)

(73) Assignee: VADIENT OPTICS, LLC, Beaverton, OR (US)

( * ) Notice: Subject to any disclaimer, the term of this patent is extended or adjusted under 35 U.S.C. 154(b) by 0 days.

(21) Appl. No.: 17/581,478

(22) Filed: Jan. 21, 2022

(65) Prior Publication Data
US 2022/0134639 A1 May 5, 2022

Related U.S. Application Data

(63) Continuation-in-part of application No. 16/439,493, filed on Jun. 12, 2019, now Pat. No. 11,469,514.
(Continued)

(51) Int. Cl.
| | |
|---|---|
| B29C 64/112 | (2017.01) |
| B29C 64/209 | (2017.01) |
| B29C 64/245 | (2017.01) |
| B33Y 10/00 | (2015.01) |
| B33Y 30/00 | (2015.01) |
| B33Y 40/20 | (2020.01) |
| B33Y 50/02 | (2015.01) |

(Continued)

(52) U.S. Cl.
CPC .......... B29C 64/112 (2017.08); B29C 64/209 (2017.08); B29C 64/245 (2017.08); B33Y 10/00 (2014.12); B33Y 30/00 (2014.12); B33Y 40/20 (2020.01); B33Y 50/02 (2014.12); B33Y 70/00 (2014.12); B33Y 80/00 (2014.12)

(58) Field of Classification Search
CPC ... B29C 64/112; B29C 64/209; B29C 64/245; B29C 64/336; B29C 64/393; B33Y 10/00; B33Y 30/00; B33Y 40/20; B33Y 50/02; B33Y 70/00; B33Y 80/00
See application file for complete search history.

(56) References Cited

U.S. PATENT DOCUMENTS

| | | | | |
|---|---|---|---|---|
| 2018/0319083 | A1* | 11/2018 | Teken | G06Q 50/04 |
| 2019/0127595 | A1 | 5/2019 | Williams | |

OTHER PUBLICATIONS

Chartoff, R. et al., "Functionally Graded Polymer Matrix Nano-Composites by Solid Freeform Fabrication: A Preliminary Report," Proceedings of Solid Freeform Fabrication Symposium, Aug. 4, 2003, Austin, Texas, 7 pages.
(Continued)

*Primary Examiner* — Rick K Chang
(74) *Attorney, Agent, or Firm* — Alleman Hall & Tuttle LLP

(57) ABSTRACT

An additively manufactured article is assembled from a plurality of printed voxels. The article includes a lattice of unit cells of a composite lattice material and an encasing matrix of structural material arranged between adjacent unit cells of the lattice. The structural material has greater mechanical strength than the composite lattice material.

20 Claims, 5 Drawing Sheets

Related U.S. Application Data

(60) Provisional application No. 63/140,173, filed on Jan. 21, 2021.

(51) Int. Cl.
*B33Y 70/00* (2020.01)
*B33Y 80/00* (2015.01)

(56) References Cited

OTHER PUBLICATIONS

Choy, T., "Effective Medium Theory: Principles and Applications, Second Edition," Oxford University Press, 2016, 7 pages. (Title and Table of Contents Submitted.).

Cohen, M. et al., "Effective Medium Theory for the Hall Effect in Disordered Materials," Physical Review Letters, vol. 30, No. 15, Apr. 9, 1973, 3 pages.

McMorrow, B. et al., "Polymer Matrix Nanocomposites by Inkjet Printing," Proceedings of Solid Freeform Fabrication Symposium, Aug. 1, 2005, Austin, Texas, 10 pages.

Sihvola, A., "Metamaterials in electromagnetics," Metamaterials, vol. 1, No. 1, Mar. 2007, 10 pages.

Singh, H. et al., "Low Profile Conformal Antenna Arrays on High Impedance Substrate," SpringerBriefs in Electrical and Computer Engineering, 2016, 6 pages. (Title and Table of Contents Submitted.).

Xie, Y. et al., "Microwave metamaterials made by fused deposition 3D printing of a highly conductive copper-based filament," Applied Physics Letters, vol. 110, No. 18, May 1, 2017, 5 pages.

\* cited by examiner

ADDITIVE MANUFACTURE USING COMPOSITE MATERIAL ARRANGED WITHIN A MECHANICALLY ROBUST MATRIX

CROSS-REFERENCE TO RELATED APPLICATIONS

This application claims priority to U.S. Provisional Patent Application Ser. No. 63/140,173 filed 21 Jan. 2021 and entitled ADDITIVELY MANUFACTURED COMPOSITES WITHIN A MECHANICAL ROBUST MATRIX. This application is also a continuation-in-part of U.S. patent application Ser. No. 16/439,493 filed 12 Jun. 2019 and entitled METHODS OF MANUFACTURING NANO-COMPOSITE RF LENS AND RADOME; the entirety of both of the above listed applications is hereby incorporated herein by reference for all purposes.

GOVERNMENT INTEREST STATEMENT

This invention was made with U.S. government support under Contract Number N00024-15-P-4545, awarded by the U.S. Navy. The government has certain rights in the invention.

TECHNICAL FIELD

The disclosure herein relates generally to the field of additive manufacture and more specifically to additive manufacture using composite materials.

BACKGROUND

Consumable materials used in additive manufacture (AM) include plastics (e.g., polyamide, urethane, acrylonitrile butadiene styrene, etc.), metals, ceramics, and combinations thereof. Such materials may be deposited top-down or bottom-up to construct a useful article of manufacture. AM-consumable materials are typically homogenous and isotropic. In some AM variants, however, a consumable material may be modified by addition of one or more fillers (i.e., material additives), yielding a composite consumable material. A suitable filler may be used to influence one or more bulk (i.e., native) properties of a consumable material in dependence on the size, composition, and/or concentration of the filler. Such influence extends naturally to the material properties of articles formed from the composite consumable material.

Generally speaking, addition of filler particles (e.g., nanoparticles) can affect the physical and mechanical properties of a host matrix. Effective medium theory (EMT) can be used to predict the maximum range of property variation achievable by incorporation of filler particles. This approach is described in EFFECTIVE MEDIUM THEORY Principles and Applications, International Series of Monographs on Physics, Second Edition, Oxford University Press (2016); and in EFFECTIVE MEDIUM THEORY FOR THE HALL EFFECT IN DISORDERED MATERIALS, Phys. Rev. Lett. 30, 696 (1973), which are hereby incorporated herein by reference for all purposes. Guided by EMT, a host matrix incorporating filler particles of a selected type, shape, and/or concentration may be engineered to exhibit one or more desired physical properties.

BRIEF DESCRIPTION OF THE DRAWINGS

The disclosure herein will be better understood from reading the following Detailed Description with reference to the attached drawing figures, wherein.

DETAILED DESCRIPTION

Figure 1:
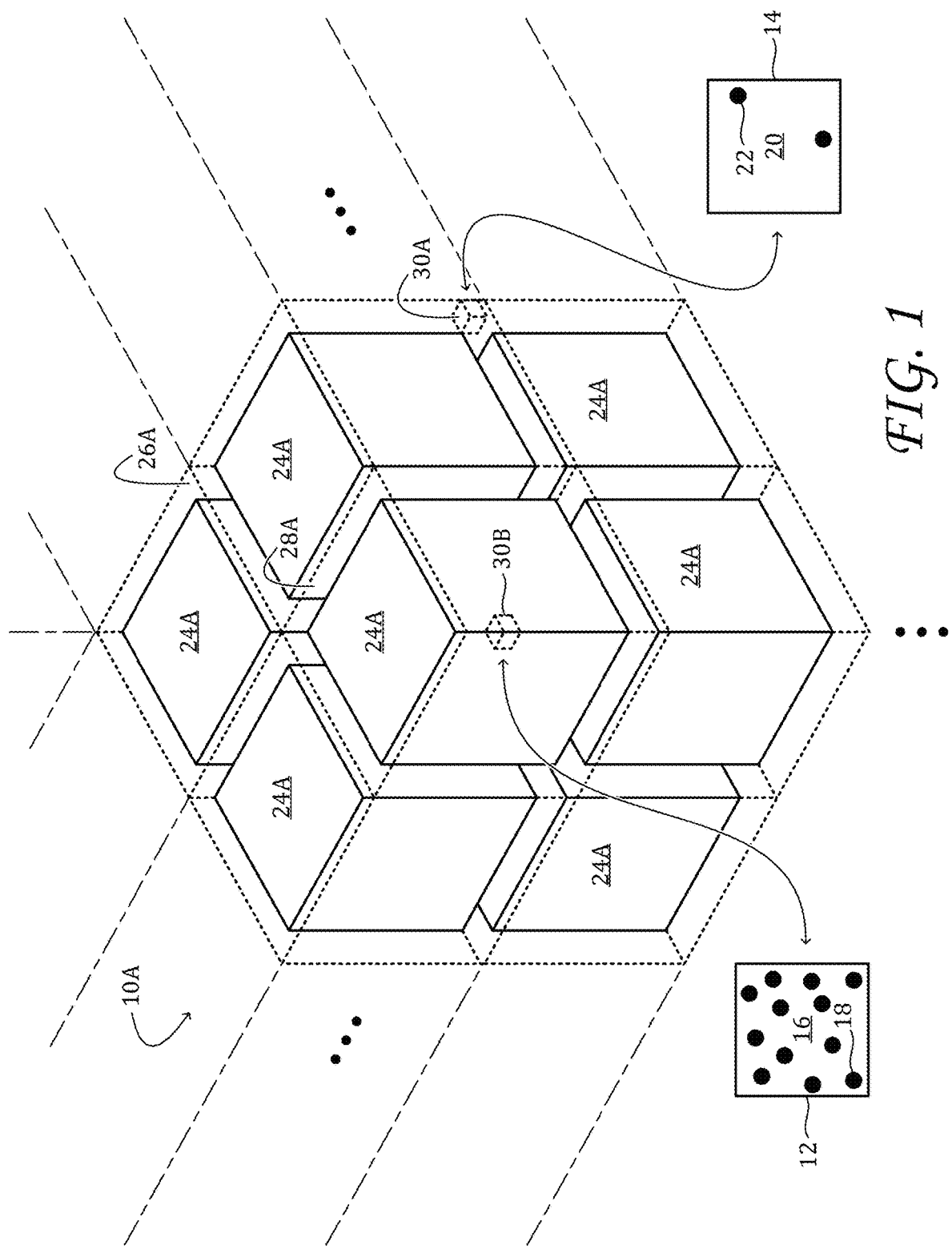
FIG. 1 shows aspects of an additively manufactured article in one example.

As noted above, composite materials can be made by incorporating fillers into host materials. In some instances, a composite material of that kind exhibits desirable properties of the host material and different desirable properties of the filler. Moreover, the grain boundaries between the host and the filler may impart additional useful properties—e.g., by limiting the range of strain-induced dislocations in the host and/or filler. Nevertheless, there is very often a limit to the amount of filler that can be dispersed into a given host using state-of-the-art fabrication due to deleterious effects on the mechanical properties of the filled material, and that limit may be less than the amount required to modify the host properties for other physical attributes to the desired extent. The AM methods herein defeat that limit by organizing the filler into localized mesoscale regions of high filler loading, separated by more structurally sound material. In this manner, the upper limit of the filler loading is governed only by the applicable AM technology, which can be quite tolerant to high filler loading in consumable composite materials. This general approach may also provide additional benefits, such as desirable surface properties, to articles formed in this manner.

As a first point of reference, unfilled nylon used in additive AM, such as HP 3D High Reusability PA 12 (a product of Hewlett Packard) yields articles with a density of 1.01 grams (g) per cubic centimeter ($cm^3$), a coefficient of thermal expansion (CTE) of $70 \times 10^{-6}$ micrometers per micrometer degree Celsius ($\mu m/(\mu m\,°C.)$), a Young's tensile modulus of 1700 megapascals (MPa), a tensile strength of 48 MPa, an elongation at break of 20 percent, and an Izod impact (notched at 3.2 mm, 23° C.) of 3.5 kilojoules per square meter ($kJ/m^2$). A 30 percent-by-volume (vol %) loading of metal oxides in nylon increases the dielectric constant relative to unfilled nylon. However, the toughness of a nylon article with more than 5 vol % loading is unacceptable for many applications, as the article becomes brittle. The toughness of an article is defined as the amount of energy the article can absorb in a standard Izod impact test. Toughness relates to the maximum sustainable stress before break and to the yield strain before break. In short, articles that absorb more energy before breaking have greater toughness and support a higher combination of stress and strain before breaking.

As a second point of reference, similar nylon with addition of 40 percent-by-weight glass bead filler (about 17 vol %) can be used to increase mechanical stiffness (Young's tensile modulus) and to reduce CTE. These materials yield articles having a density of $1.30\,g/cm^3$, a CTE of $30 \times 10^{-6}$ $\mu m/(\mu m\,°C.)$, a Young's tensile modulus of 2800 MPa, a tensile strength of 30 MPa, an elongation at break of 6.5 percent, and an Izod impact (notched at 3.2 mm, 23° C.) of 2.7 $kJ/m^2$. However, the addition of the glass bead filler reduces toughness and ductility; the 'elongation to break' is reduced, as is the Izod impact energy. When an even higher filler loading is attempted, such as 30 to 50 vol %, the elongation to break falls below 1 percent, such that articles made with these materials are very brittle.

Furthermore, when composite materials of high filler loading are used on the surface of a finished article (as may be required for printing electrical traces or cosmetic finishes) the surface finish may be unacceptably rough. High filler loading may also lead to percolation paths that reduce the chemical resistance of the surface of an article. Thus, for composite materials of high filler loading (e.g., >1 vol %) there currently exists an unacceptable tradeoff of desirable material properties (e.g., mechanical toughness, robustness, chemical resistance, and surface finish) to secure desired physical performance (e.g., mechanical, dielectric, electromagnetic, or optical performance).

This disclosure presents a novel and non-obvious approach for addressing the above issues. In non-limiting examples, the solutions herein support AM of articles comprising nanocomposites with effective medium-wave impedances closely matched to that of free space, which may reduce radio-frequency (RF) and/or microwave scattering, for example, at frequencies of 10 to 50,000 MHz. Such articles may have a locally adjustable refractive index over this frequency range, achieved via modulation of the loading fraction of magnetic nanoparticles. Such articles may comprise low-loss nanocomposite materials that can alter transmitted wavefront shapes by presenting a spatially graded refractive index. Furthermore, such articles may exhibit greater than 6 percent elongation to yield before break, a 30 MPa tensile strength, and a 1.8 GPa Young's tensile modulus, combined with the desired electromagnetic performance.

Additional features will now be presented by way of example and with reference to the drawing figures listed further above. Components, process steps, and other elements that may be substantially the same in one or more of the figures are identified coordinately and are described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

FIG. 1 shows aspects of an example article 10A. The article comprises a lattice material 12 and a structural material 14. The lattice material is a composite material; it comprises a first host material 16 and a first filler 18. In the illustrated example, structural material 14 surrounds lattice material 12 in article 10A. In some examples structural material 14 has greater mechanical strength than lattice material 12.

Article 10A may be configured to exhibit certain physical properties based on lattice material 12 and on structural material 14. For example, lattice material 12 may have a high loading of first filler 18, so as to achieve a desired physical property (e.g., dielectric constant, dielectric strength, impedance, dielectric loss, permeability, permittivity, magnetic moment, color, index of refraction, electrical conductivity, thermal conductivity, etc.). Other properties of article 10A (e.g., mechanical properties such as durability, stiffness, elasticity, hardness, ductility, toughness, etc.) may be enhanced by a structural material 14 configured to impart such properties. In examples in which the exterior surface of article 10A comprises primarily structural material, as shown in FIG. 1, the structural material may also provide a superior surface finish and enhance chemical resistance relative to lattice material 12.

First host material 16 is an AM-compatible material. The first host material may comprise one or more of a cured resin, a thermoplastic polymer, a thermosetting polymer, a photosetting polymer, a cross-linked polymer, a metal, and/or any other AM-compatible material. In more particular examples the first host material may comprise polyamide (e.g., nylon), acrylic, polyethylene of any density, or polyactic acid (PLA), among others.

First filler 18 may comprise one or more nanoparticle species—e.g., metal nanoparticles, metal-oxide nanoparticles, semiconductor nanoparticles, ceramic nanoparticles, ferromagnetic nanoparticles, polymer nanoparticles, dye and/or pigment nanoparticles, fullerenes and nanotubes, among others. Such nanoparticles may be shaped as rods, fibers, spheres, plates, polyhedrons, and/or other shapes. Such nanoparticles may be sized from about 1 to 1000 nanometers (nm) in some examples. In other examples, the filler may comprise larger particles—e.g., particles up to 3 μm in size.

In more particular examples, first filler 18 may comprise magnetic nanoparticles—e.g., $Ni_{0.5}Zn_{0.5}Fe_2O_4$ particles about 50 to 70 nm in diameter. Here lattice material 12 is engineered to function as an RF and/or microwave-active component of article 10A, offering wave-impedance and refractive-index properties adjustable as functions of the loading of first filler 18 within the lattice material. In some examples the concentration of first filler 18 in lattice material 12 may be 1 vol % or greater, 10 vol % or greater, 30 vol % or greater, or 50 vol % or greater. As discussed hereinafter, a substantially 100 vol % nanoparticle filler concentration may be achieved via sintering, which removes first host material 16 and interconnects the nanoparticles of first filler 18.

Continuing in FIG. 1, in the illustrated example structural material 14 is itself a composite material, comprising a second host material 20 and a second filler 22. In such examples, the second filler may comprise any of the material, size, shape, and/or other variants indicated above for first filler 18. With respect to particle size and composition, the first and second fillers may be the same in some examples but different in other examples. Likewise, in some examples second host material 20 may be the same as first host material 16, while in other examples the first and second host materials may differ. In some examples, the concentration of second filler 22 in structural material 14 is less that the concentration of first filler 18 in lattice material 12. In some examples, the concentration of the second filler may be zero, such that the structural material is a homogeneous, non-composite material. In some examples article 10A may comprise a greater vol % of structural material 14 than lattice material 12. In other examples, the amount of the structural material may be limited so as to provide maximum loading of lattice material 12 in article 10A, or in predetermined regions of the article.

In the example shown in FIG. 1, lattice material 12 is distributed in article 10A in the form of a lattice of unit cells 24A. Structural material 14 is arranged in the form of an encasing matrix 26A, which encases each unit cell. In the drawing the unit cells are delimited by solid lines; the encasing matrix is exterior to the unit cells and delimited by dashed lines. Each unit cell 24A in FIG. 1 is a rectangular prism of like dimensions and orientation. In other examples, the units cells may differ with respect to shape, dimensions, and/or orientation. Example shapes of the unit cells may include triangular prisms, cubes and cuboids, pentagonal prisms, hexagonal prisms, tetrahedrons, dodecahedrons, icosahedrons, octahedrons, square pyramids, pentagonal pyramids, hexagonal pyramids, octagonal pyramids, spheres and ellipsoids, cones and high-order conics, cylinders, helices, and/or toruses.

The order of the structure may be hierarchical. The hierarchical order of unit cells is defined as the number n of levels of scale with recognized structure. n=0 corresponds to a material viewed as a continuum for the purpose of analysis of physical properties; n=1 (first order) could represent a latticework of continuous ribs or the atomic lattice of a crystal. At each level of the structural hierarchy, one may model the material as a continuum for the purpose of analysis. Strictly, such an assumption is warrantable only if the structure size at each level of the hierarchy is very different. The idea of hierarchical structure can be the basis of the synthesis of new microstructures which give rise to enhanced or useful physical properties. Benefits of hierarchical structure can include improved strength and toughness, or unusual physical properties such as a negative Poisson's ratio. Finally, the idea of hierarchical structure, based on different length scales can be the basis of optical or electro-magnetic (EM) properties, wherein different orders of the hierarchy may give rise to properties of different wavelength of optical or EM radiation.

In some examples, unit cells 24A can be configured to have a relatively high volume-to-surface-area ratio, to realize a corresponding high loading of first filler 18 in article 10A. For instance, a lattice of tetrahedral unit cells may extend throughout the body of article 10A. In some examples, at least some unit cells of a given article may differ from each other with respect to composition, shape, dimensions, and/or orientation. Although encasing matrix 26A separates adjacent unit cells 24A in FIG. 1, that aspect is not strictly necessary. In some examples unit cells may be fused or otherwise interconnected. Interconnected unit cells, throughout the article or localized within particular regions, may be advantageous for promoting thermal and/or electrical conductivity within an article, or to secure other advantages.

As noted above, unit cells 24A may be arranged in the form of a lattice. Unit-cell lattices may be one or more of regular, periodic, aperiodic or pseudorandom, layered, shell-like, and crystallographic-like. More particular example lattice types include body-centered cubic (BCC), body-centered cubic with z-struts (BCCz), face-centered cubic (FCC), plastic face-centered cubic (PFCC), body-centered and face-centered cubic combined (F2BCC), etc., as well as periodic and aperiodic gyroid and double gyroid lattices. In some examples, the lattice type governing the disposition of the unit cells may vary from one locus to another within an article. Generally speaking, such variation may be periodic or aperiodic. The variation can be configured to increase strength, improve hardness, reduce fatigue or cracking, or to achieve other objectives. For instance, the variation may be configured to improve an article's ability to endure thermal cycling and thermal shock—e.g., by altering the dissipative and insulative properties of the article (as a whole or within localized regions).

Continuing in FIG. 1, structural material 14 of encasing matrix 26A is arranged between adjacent unit cells 24A. In that sense the encasing matrix structurally defines the lattice of unit cells. In some examples, as illustrated in FIG. 1, the encasing matrix comprises a series of partitions 28A that separate adjacent unit cells. The physical metrics of encasing matrix 26A, such as partition thickness, are not particularly limited. In some examples, transitions in the encasing matrix, such as partition edges or corners, may be chamfered or rounded. In other examples, the transitions may include triangular facets. Example encasing matrices may include shells, walls, or any framework suitable for partitioning the unit cells into the desired lattice or lattices.

The structural material 14 of encasing matrix 26A supports mechanical loading of article 10A and also imparts desired mechanical properties (e.g., smoothness, hardness and toughness), both at the surface and throughout the body of the article. In this configuration, mechanical stress and strain transmit and distribute through the interconnected regions surrounding unit cells 24A. In some examples, the dimensions of the partitions of the encapsulating matrix may vary within an article. Such dimensions and any variation thereof may be predetermined, using finite-element analysis (FEA). Using this technique, partitions may be engineered thick enough to effectively transmit mechanical forces but also as thin as possible, in order to maximize the concentration of the first filler within the article, if desired.

The cross section of encasing matrix 26A in the lattice planes of unit cells 24A is relevant to the layer-by-layer fabrication of article 10A via AM (vide infra). In the example illustrated in FIG. 1 the cross section of the encasing matrix comprises an array of square frames, the pattern in which structural material 14 is deposited in each layer that passes through a unit cell. In other examples, the cross section may comprise an array of frames or loops of other shapes—triangles or other polygons, circles, fractal shapes, random geometric shapes, etc. In some examples the shape and/or dimensions of the frames or loops may vary as a function of depth into the article—i.e., from one layer to the next in AM process.

Continuing in FIG. 1, encasing matrix 26A of article 10A comprises a plurality of voxels 30A of structural material 14. Likewise, each unit cell 24A comprises a plurality of voxels 30B of lattice material 12. Only one voxel of each kind is identified in the drawing, but the entire article is comprised of and assembled from a plurality of printed voxels. A 'voxel' is defined herein as the smallest volumetric element that an AM apparatus can deposit individually. Accordingly, voxels are the basic building blocks in AM and determine the minimum feature size of a formed article. Voxels are created as needed in AM to achieve the intended article shape and desired physical properties (mechanical, electrical, electromagnetic, optical, thermal etc.), via control of material composition. In some examples, each unit cell 24A may be at least one order of magnitude larger than each of the printed voxels 30B that make up the unit cell. Nevertheless, encapsulation of single voxels is also envisaged, for certain applications. In some examples, a heterogeneous array of voxels can be used to create unit cells 24A. Such voxels may include fillers of different kinds embedded in one or more host materials. Thus, the properties of the voxels may be non-uniform even within a single unit cell. Voxels may be deposited according to a graded, periodic, or otherwise controlled variation of composition.

EMT may be used to predict the properties of lattice material 12 and of article 10A as an ensemble of unit cells. At both scales (unit-cell and ensemble), EMT can be used to approximate the effect of first filler 18 on the article as a whole. For example, a 50 vol % loading of fillers in the voxels that comprise unit cells 24A, assuming that 90 percent of the volume of the article comprises unit cells and that first and second host materials 16 and 20 are the same, results in an overall 45 vol % effective loading. This effective loading density is much higher than could be achieved in a homogenously filled article that has acceptable durability. Such an article would be limited to a much lower homogeneous fill loading, such as 1 vol %, in order to achieve acceptable durability.

In some examples thermal stresses related to the difference in CTE between a highly loaded lattice material 12 within the unit cells (with low CTE) and the mechanically robust structural material 14 of encasing matrix 26A (with higher CTE) can be minimized by judicious material selection, thereby providing closely matched CTE. Alternatively, unit-cell size can be reduced in order to shorten the distance over which the CTE mismatch takes place. Furthermore, non-periodic, random, and/or fractal unit-cells or cellular lattice structures may be used to break up the mismatched displacement caused by thermal expansion or contraction. Further still, unit-cell edges may be rounded or chamfered to reduce thermal and/or physical stress concentrations and thereby improve mechanical robustness. Issues related to preferential fracturing or fatigue can be addressed using a similar approach. In these examples, structures having the desired properties can be engineered using FEA.

Figure 2:
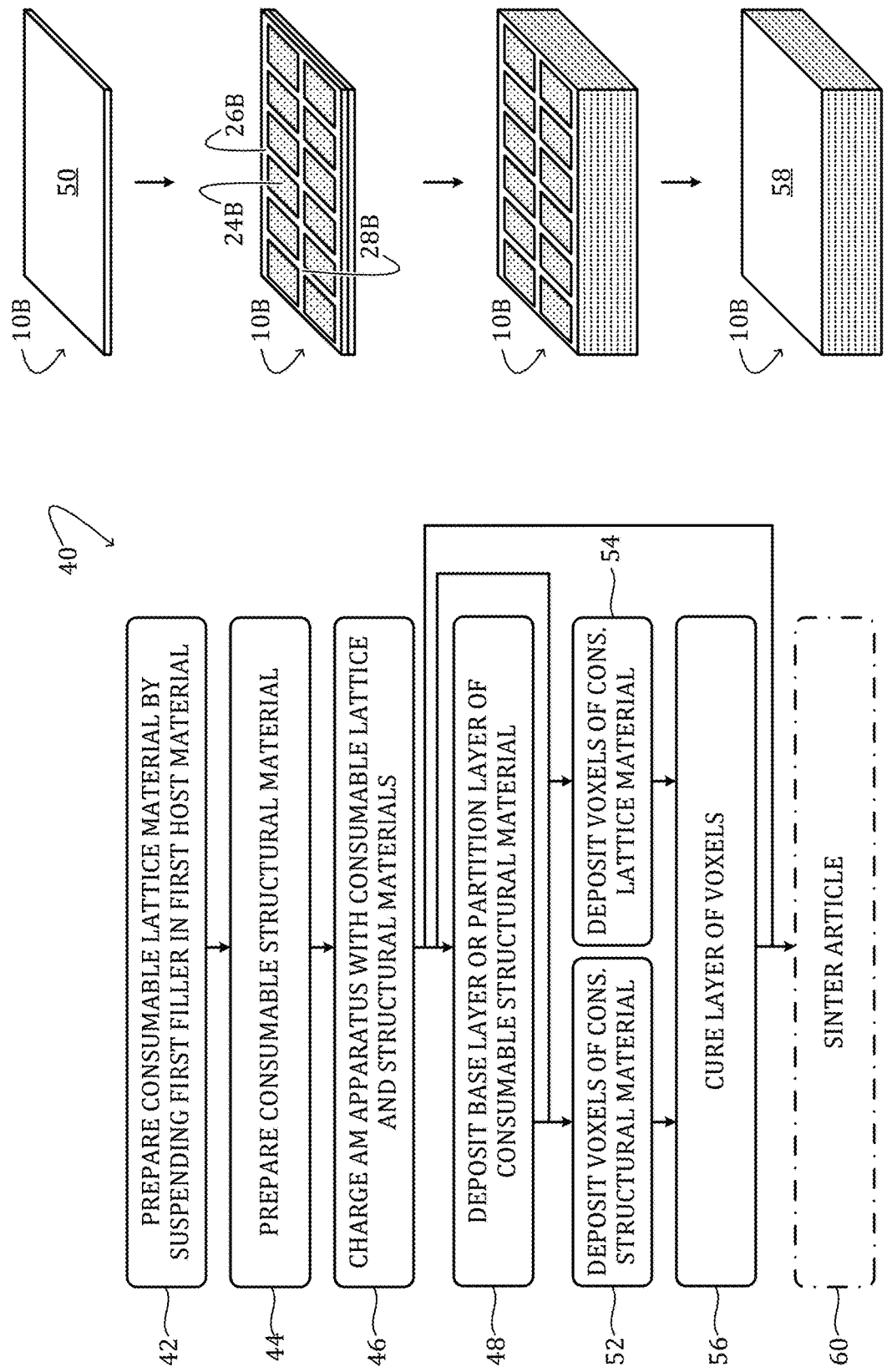
FIGS. 2A and 2B show aspects of an example method of additive manufacture of an article.

FIGS. 2A and 2B show aspects of an example method 40 for additive manufacture of an article as described hereinabove. The article may be fabricated using three dimensional (3D) printing in some examples. Both the lattice material and the structural material may be deposited in this manner. Suitable AM variants include: inkjet print (IJP), fused-deposition modeling (FDM), electron-beam freeform fabrication (EBF), selective laser sintering (SLS), multi-jet fusion (MJF), multi-jet printing (MJP), stereo lithography (SL), direct metal laser sintering (DMLS), selective laser melting (SLM), and multi-photon photopolymerization (MPPP), as examples.

At 42 of method 40, consumable lattice material is prepared by suspending a first filler (e.g., first filler 18 hereinabove) in a first consumable host material. First filler concentrations may range from about 1 to 30 vol % or higher. The first consumable host material is related to first host material 16 hereinabove. In some examples these materials may be identical, however some differences are also envisaged. For instance, in examples in which the first host material is a thermosetting or photosetting polymer, the first consumable host material may comprise the corresponding monomer or non-cross-linked resin, combined with a suitable initiator or cross-linking agent. In other examples, the first consumable host material may comprise a solvent that volatilizes during the AM process and is therefore absent in first lattice material 12. At 44 consumable structural material 14 is prepared. In some examples the consumable structural material may be prepared by suspending a second filler 22 in a second consumable host material. The skilled reader will appreciate that the second consumable host material is related to second host material 20 in the same manner indicated above. At 46 the AM apparatus is charged with the consumable lattice material and with the consumable structural material.

At 48 of method 40 a base layer 50 of consumable structural material is deposited. The base layer may serve as a seed layer or bottom encapsulation layer of article 10B. In some examples the base layer may comprise 100 vol % consumable structural material or second consumable host material itself In some examples the base layer may be deposited onto a platen of an inkjet printer. At 52 voxels of consumable structural material are deposited in a pattern corresponding to the encasing-matrix portion 26B of a given layer. At 54 voxels of consumable lattice material are deposited in a pattern corresponding to the unit-cell portion 24B of the same layer. The patterns of consumable lattice material and of consumable structural material in each individual layer is essentially a cross section of article 10B in the cutting plane of the layer. For polyhedral unit cells, the patterns of consumable lattice material are arrays of filled rectangles, and the patterns of consumable structural material are grid-like, with a gridline thickness corresponding to the desired partition thickness in the article. For unit cells in the form of spheres, cones, or cylinders, the patterns of consumable lattice material are arrays of filled circles, and the patterns of consumable structural material are networks of interconnected loops, again having thickness corresponding to the desired partition thickness in the formed article. In some examples an inkjet controller may be programmed to print such patterns in a predetermined sequence, corresponding to the required layers from bottom to top in article 10B.

In some examples, the voxels of the consumable structural material and the voxels of the consumable lattice material may be deposited concurrently. In other examples, the two kinds of voxels may be deposited alternately or sequentially. In some examples consumable lattice material may be applied to fill previously formed partition regions 28B of the encasing matrix. In other examples, consumable structural material may be applied to fill in the spaces between previously formed unit-cell portions 24B of the lattice. Irrespective of the order of the deposition, the lattice material may be surrounded on all sides by mechanically robust structural material. Applied in this manner, encasing matrix portion 26B may be one or a few or more voxels thick. In some examples the lattice material may be completely encapsulated by the structural material. In other examples, gaps or windows may be incorporated into partition regions 28B to allow adjacent unit cells to interconnect (vide infra).

In some examples the transition between the structural material of the encasing matrix and the lattice material of the unit cells may be an abrupt transition. This strategy may be used to achieve the highest overall filler loadings possible while maintaining structural integrity. In other examples the transition may be gradual—e.g., the first-filler concentration, maximal at the center of a given unit cell, may decrease gradually to the second filler concentration of the structural material as the encasing matrix is approached. That strategy may optimize cohesion between the lattice material and the structural material and increase thermal stability of the article, for example.

Continuing in FIG. 2A, as each successive layer of article 10B is built up, the materials deposited may be cured, at 56 of method 40. In examples in which the consumable lattice material and/or the consumable structural material includes a photopolymerizable monomer, photoinitiator, or photoactive cross-linking agent, curing may be enacted using a suitable light source (e.g., a filament, discharge, LED, or laser light source. In some examples such materials may be cured as they are deposited. Alternatively or in addition, curing may be enacted using an oven or heat lamp. Curing may be intermittent, periodic, or scheduled in any suitable manner.

As discussed above, the lattice material may be engineered to impart desirable properties to additively manufactured articles. Such properties may include dielectric constant, dielectric strength, permeability, permittivity, magnetic moment, stiffness, elasticity, color, index of refraction, electrical conductivity, thermal conductivity, and/or surface finish, as examples. Significantly, method 40 allows deposition of lattice material at the maximum first-filler loading compatible with the AM process, irrespective of the mechanical properties of the lattice material itself.

In some examples steps 52 through 56 of method 40 are repeated, voxel layer by voxel layer, until the desired unit-cell layer is built up. At that point the method returns to 46, where a subsequent partition layer of consumable structural material is deposited. The outer loop in FIG. 2A is now repeated until the desired article is completed by addition of a top layer 58 of consumable structural material. In this manner, the lattice material of the article is physically supported by mechanically robust structural material. At optional step 60 the article may be sintered to remove the first consumable host material from the consumable lattice material. This variant enables deposition of substantially 100 vol % of the first filler within the article.

Figure 3:
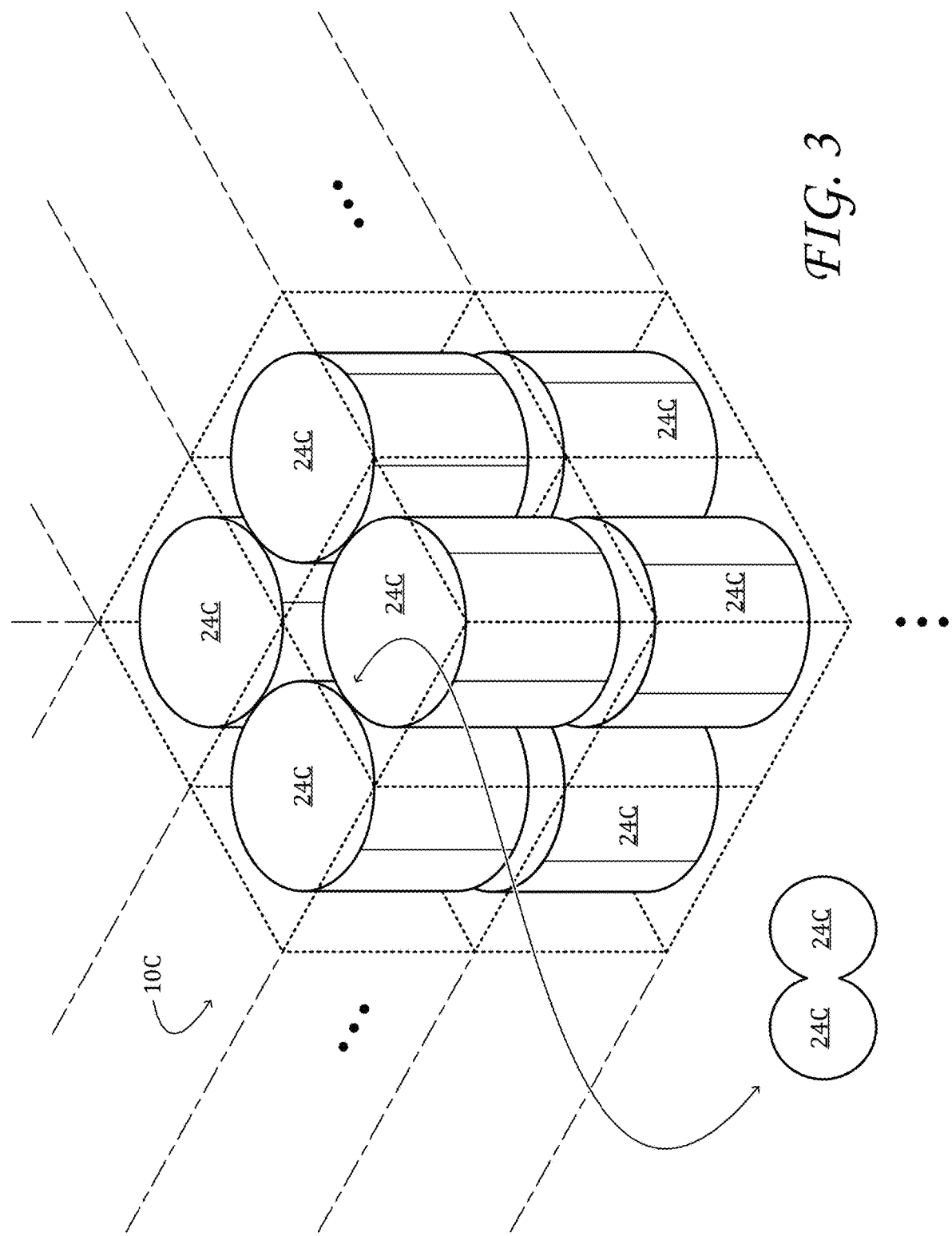
FIGS. 3 through 5 show aspects of additively manufactured articles in other examples.

FIG. 3 shows aspects of another additively manufacture article 10C. Article 10C is similar to article 10A of FIG. 1, however the shape of unit cells differs in the two examples. In addition, encasing matrix 26C of article 10C surrounds but does not completely separate each unit cell 24C from adjacent unit cells. Rather, at least some of the adjacent unit cells of article 10C are contiguous. This feature may provide electrical and/or thermal conduction pathways through the lattice material of the article. In examples in which article 10C is sintered in the final stage of AM, the region of intimate contact between adjacent unit cells may be broadened or diffused, as shown in the inset.

Figure 4:
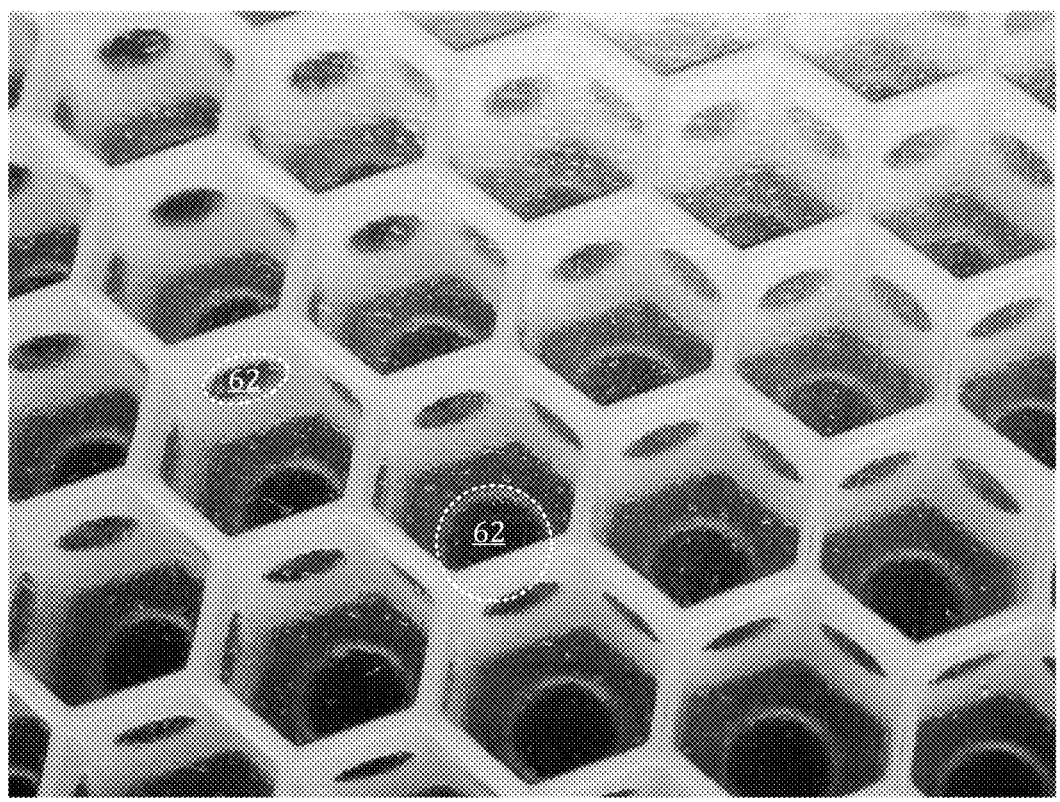
Figure 5:
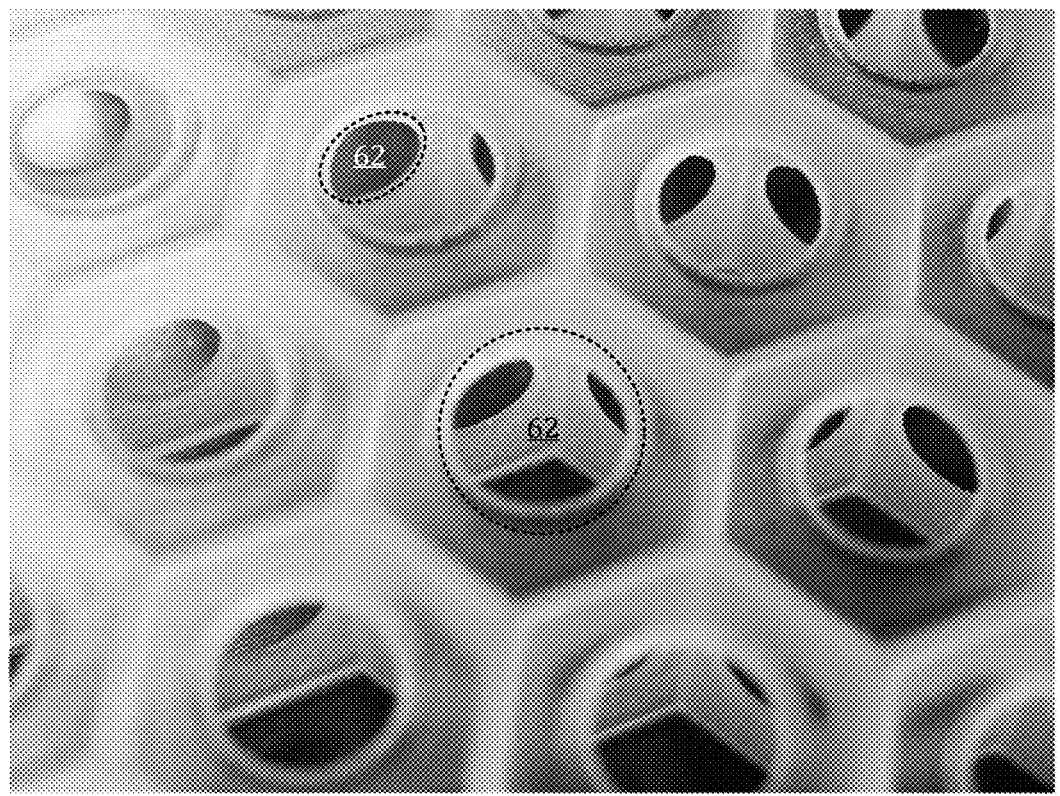
Figure 6:
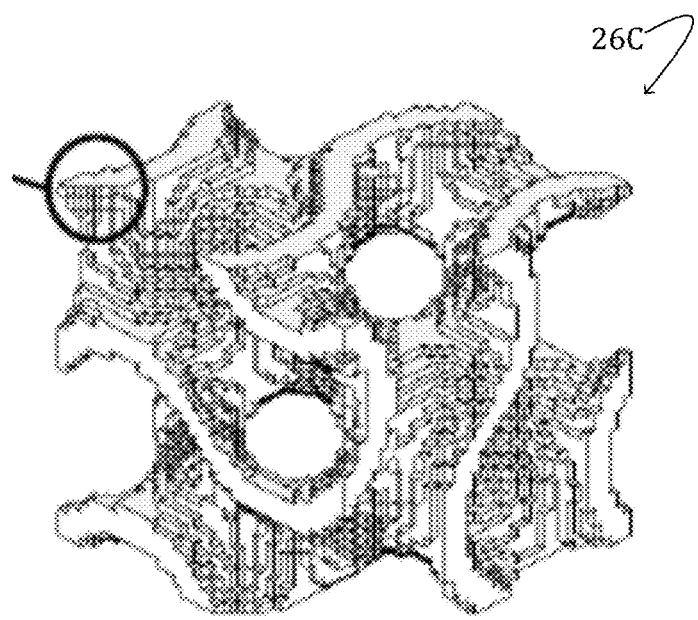
FIG. 6 shows aspects of an encasing matrix of an additively manufactured article in one example.

FIG. 4 is a photograph of yet another additively manufactured article 10D at one stage of fabrication. In article 10D the encasing matrix takes the form of a vertically oriented honeycomb of hexagonal partitions. An opening 62 is arranged in each rectangular side-wall and each hexagonal face of the partitions. This feature may be used to allow electrical, thermal, and/or fluidic (e.g., charge carrier) communication through the lattice material of the unit cells. In configurations as shown in FIG. 4, a very low density of structural material may be realized. In the photographed article 10D, the density of the structural material is about 0.17 g/cm$^3$. FIG. 5 is an enlarged photograph of article 10D at a subsequent stage of fabrication. FIG. 5 provides a better view of the openings arranged on the hexagonal faces of the partitions. Although regular geometric partition geometries are indeed useful, the methods herein are also applicable to the formation of articles in which the encasing matrix has an aperiodic and/or fractal partition geometry. FIG. 6 shows aspects of a portion of an encasing matrix 26C having partitions in the form of a double gyroid.

The approaches set forth herein may be used to produce metamaterials. For relevant context, the interested reader is directed to METAMATERIALS IN ELECTROMAGNETICS, *Metamaterials* 1, 1, 2-11 (2007); and MICROWAVE METAMATERIALS MADE BY FUSED DEPOSITION 3D PRINTING OF A HIGHLY CONDUCTIVE COPPER-BASED FILAMENT, *Appl. Phys. Lett.* 110, 181903 (2017), which are hereby incorporated herein by reference, for all purposes.

Articles as described herein may have various practical applications. For example, conventional materials interact with electromagnetic radiation like light or radio waves based on the properties of the material. The wave impedance of an electromagnetic wave is the ratio of the transverse components of the electric and magnetic fields (the transverse components being those at right angles to the direction of propagation). For a transverse-electric-magnetic (TEM) plane wave traveling through a homogeneous medium, the wave impedance is everywhere equal to the intrinsic impedance of the medium. In particular, for a plane wave travelling through empty space, the wave impedance is equal to the impedance of free space.

The size of the filler particles and structures influences the properties of optical and electro-magnetic (EM) waves that interact with the materials. The Mie solution to Maxwell's equations (also known as the Lorenz-Mie solution, the Lorenz-Mie-Debye solution or Mie scattering) describes the scattering of an electromagnetic plane wave by a homogeneous sphere. The Mie scattering formulas are most useful in situations where the size of the scattering particles is comparable to the wavelength of the light, rather than much smaller or much larger. The formalism allows the calculation of the electric and magnetic fields inside and outside a spherical object and is generally used to calculate either how much light is scattered (the total optical cross section), or where it goes (the form factor). Rayleigh scattering describes the elastic scattering of light by spheres that are much smaller than the wavelength of light. Rayleigh scattering is strongly dependent upon the size of the particle and the wavelengths. The intensity of the Rayleigh scattered radiation increases rapidly as the ratio of particle size to wavelength increases.

In light of the above context, RF radomes impedance-matched to free space may be produced according to the methods herein. Such radomes, wherein loss is reduced and range is increased, may comprise 30 vol % nanoferrites in a nylon matrix, maintaining necessary mechanical strength and toughness via the nylon.

In addition high-capacity 3D printed capacitors are achievable, with surface finish compatible with secondary processing for conductive pads and internal mechanical strength compatible with field stresses and normal handling. Also achievable are aluminum or polymer enclosures with built-in magnetic shielding.

Articles as described herein may also have practical applications as antenna substrates. The substrates of planar antennas play a very important role in achieving desirable electrical and physical characteristics. For example, high impedance substrates (HIS) may provide improved impedance matching, enhanced bandwidth, and increased broadside directivity owing to total reflection from the reactive surface and high input impedance. This is discussed in the paper Singh, Hema, R. Chandini, and Rakesh Mohan Jha. "Low profile conformal antenna arrays on high impedance substrate." Low Profile Conformal Antenna Arrays on High Impedance Substrate. Springer, Singapore, 2016, which is hereby incorporated herein by reference for all purposes.

Figure 7:
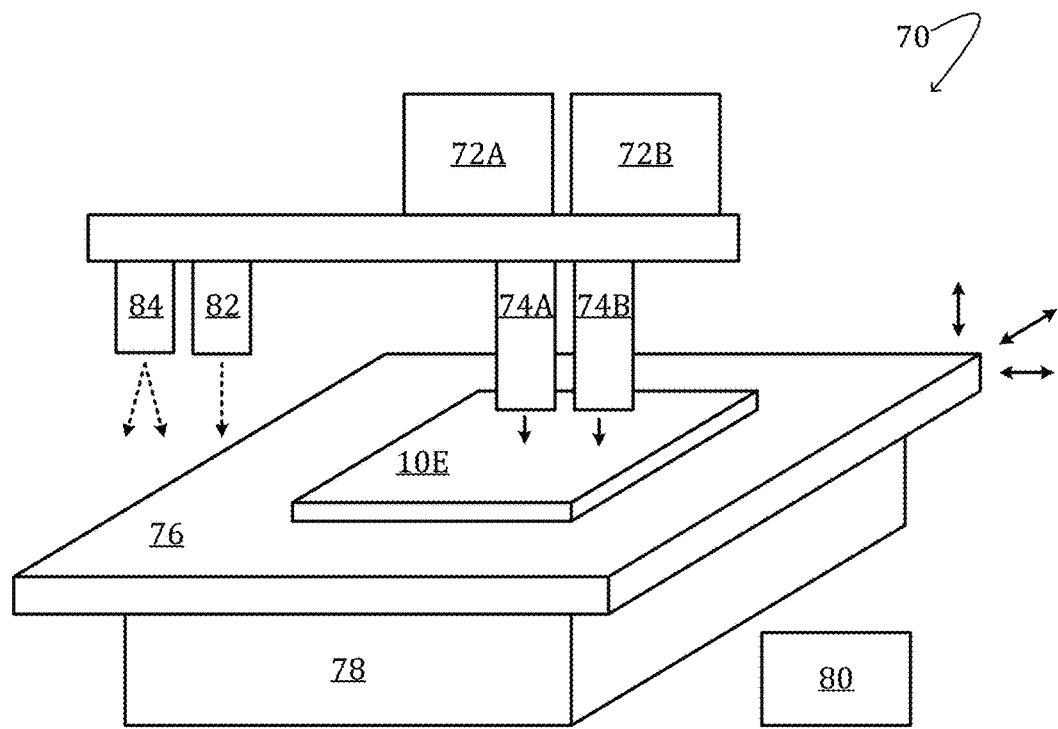
FIG. 7 shows aspects of an example apparatus configured for additive manufacture of an article.

FIG. 7 shows aspects of an example apparatus configured for additive manufacture of an article. Additional details of the apparatus are found in U.S. patent application Ser. No. 16/224,512 entitled PRINTED CIRCUIT BOARD WITH INTEGRATED OPTICAL WAVEGUIDES; AND FUNCTIONALLY GRADED POLYMER MATRIX NANOCOMPOSITES BY SOLID FREEFORM FABRICATION, Solid Freeform (SFF) Symposium (2003); and POLYMER MATRIX NANOCOMPOSITES BY INK-JET PRINTING, Solid Freeform (SFF) Symposium (2005), which are hereby incorporated herein by reference for all purposes.

Apparatus 70 of FIG. 7 includes reservoir 72A holding consumable structural material and reservoir 72B holding consumable lattice material. Reservoirs 72A and 72B are coupled fluidically to print heads 74A and 74B, respectively. Each print head is configured to discharge AM-compatible consumable material onto article 10E, arranged on platen 76. More particularly, each print head is configured to add individual voxels of consumable material to the article. The platen is coupled mechanically to translational stage 78. The translational stage is configured to adjust the displacement of the platen along each of the three Cartesian axes. In other examples, displacement along any, some, or all of the Cartesian axes may be adjusted by movement of the print heads instead of the platen. In still other examples, a translational stage may adjust the relative displacement of the platen and print heads along two Cartesian axes, and a rotational stage (not shown in the drawings) may be used to adjust the azimuth of voxel deposition in the plane orthogonal to the two Cartesian axes. In every case, the adjustment is controlled (e.g., servomechanically), pursuant to control signals from controller 80. More particularly, the controller may be configured to transmit, to the translational stage and to the first and second print heads, signal defining (a) the pattern corresponding to the unit-cell portion and (b) the pattern corresponding to the encasing-matrix portion, for each of a plurality of voxel-thick layers of the article. The controller may compute these patterns by parsing a 3D digital model of the article to be fabricated (with predefined unit-cell and encasing-matrix geometries) and returning the intersection of the 3D digital model with a series of cutting planes corresponding to the plurality of layers.

Continuing in FIG. 7, apparatus 70 includes a directed optical emitter 82 and a diffuse optical emitter 84. The optical emitters may comprise lasers or lamps of any emission profile suitable for curing the consumable materials. The displacement of the optical emitters relative to platen 76 may be controlled in the same manner as the displacement of the print heads relative to the platen. The directed optical emitter may be used for selective, localized curing of certain regions of voxels, and the diffuse optical emitter may be used to cure larger regions of the article.

The following paragraphs lay out various examples drawn from the foregoing disclosure. Such examples include example articles, methods for forming the articles, and apparatuses that support the methods.

One example is an additively manufactured article assembled from a plurality of printed voxels. The article comprises: a lattice of unit cells of a composite lattice material; and an encasing matrix of structural material arranged between adjacent unit cells of the lattice, the structural material having greater mechanical strength than the composite lattice material.

In some implementations the lattice composite material is optimized for its permeability, permittivity, impedance, index of refraction, or complex dielectric properties. In some implementations the effective impedance of the article is matched to free space. In some implementations the article is used as a radome. In some implementations the composite article is a radio-frequency lens. In some implementations the article is used as an antenna substrate. In some implementations the size of the unit cells is non-uniform. In some implementations the size of the unit cells is smaller than $\frac{1}{10}$th the wavelength of incident light in the wavelength range 10 MHz to 10,000 MHz. In some implementations the lattice packing of the unit cells is non-uniform. In some implementations the article is non-planar. In some implementations the size or lattice packing of the unit cells is determined by the shape of the article. In some implementations the composition of the fillers are varied as a function of the by the shape of the article. In some implementations the composite lattice material includes ferromagnetic, ferrite, hexaferrite, barium hexaferrites, strontium hexaferrite, M-type hexaferrite fillers, or bi-, tri- or tetra-valent metal ion substituted hexaferrites sized below 1 micron. In some implementations the encasing matrix of structural material is composed of nylon, PEEK (polyetheretherketone), PEI (polyetherimide), PAI (polyamideimide), PPS (polyphenylene sulfide), ABD (Acrylonitrile butadiene styrene), epoxy, or thermoplastic. In some implementations the encasing matrix of structural material includes ceramic, plastic, glass, glass fiber, or carbon-based particle fillers. In some implementations the unit cell packing structure is a hexagonal, honeycomb, chiral honeycomb, triangular, star-shaped, polygon, cubic, diamond cubic, face-edge cube, edge-vertex cube, face-vertex cube, or face-edge-vertex cube. In some implementations a conductive metal antenna is printed or deposited on the surface. In some implementations a periodic diffractive metal lattice is printed is printed or deposited on the surface. In some implementations the unit cell lattice packing is fractal. In some implementations the unit cell length dimensions are sized at a fraction of the wavelength dimension sufficient to prevent Rayleigh scattering of optical or electromagnetic waves. In some implementations the unit cell length dimensions are sized at a fraction of the wavelength dimension sufficient to prevent Mei scattering of optical or electromagnetic waves. In some implementations the unit cells are packed in a three-dimensional hierarchical architecture with length scales that differ by more than three times in any one direction.

Another example is a method of additive manufacture of an article, the method comprising: (a) printing a first series of voxels of consumable lattice material in a pattern corresponding to a unit-cell portion of a layer of the article; (b) printing a second series of voxels of structural material in a pattern corresponding to an encasing-matrix portion of a layer of the article, the structural material having greater mechanical strength than the composite lattice material; and (c) curing the first and second series of voxels.

In some implementations the lattice material is a ferrite and polymer composite feedstock loaded with ferrite nanoparticles to at least 1%, and up to 50%, by volume. In some implementations the ferrite nanoparticle size is based achieving a single magnetic domain. In some implementations the ferrite feedstock is chosen from the spinel ferrite, hexaferrite, garnet, perovskite ceramic material classes, or polymer air mixtures thereof. In some implementations the ferrite nanoparticles have surface ligand functionality.

Another example is a composite article comprising: a lattice material including a first host material and a first filler; and a structural material including second host material. The structural material has greater mechanical strength than the lattice material and the structural material is arranged into an ordered matrix, crystallographic-like lattices, unit cells, or combinations thereof surrounding the lattice material.

In some implementations, the structural material in the example above has a second filler. In some implementations the second filler and the first filler are the same, and the concentration of second filler in the structural material is an order of magnitude less concentrated than the first filler in the lattice material. In some implementations, the first filler comprises a nanoparticle. In some implementations the structural material is arranged as unit cells with geometry within a single plane shaped as a square, rectangle, hexagonal, tetrahedron, high order conic, triangular, fractal geometry, random geometric volume, or any combination thereof. Some implementations of the above example admit of more than one geometry in a single plane. In some implementations the first filler concentration by percent volume of the lattice material is 1 percent or greater, 10 percent or greater, 30 percent or greater, or 50 percent or greater. In some implementations, the article has a greater concentration of the structural material than the lattice material.

Another example is a method for additive manufacture of a composite article, the method comprising: (a) depositing a lattice material including a first host material and a first filler; and (b) depositing a structural material including second material, wherein the structural infill material has greater mechanical strength than the lattice material, wherein the deposition of the lattice material and the structural material results in the structural material being arranged into ordered lattices, crystallographic-like lattices, unit cells, and combinations thereof and the lattice material surrounds the structural material.

In some implementations of the above examples, the additive manufacturing is three-dimensional printing including one or more of: inkjet print (IJP), fused deposition modeling (FDM), electron beam freeform fabrication (EBF), selective laser sintering (SLS), multi-jet fusion (MJF), multi-jet printing (MJP), stereo lithography (SL), direct metal laser sintering (DMLS), selective laser melting (SLM), multi-photon photopolymerization (MPPP) are used. In some implementations the first filler of the lattice material has a loading 1 percent or greater, 10 percent or greater, 30 percent or greater, or 50 percent or greater. In some implementations the first filler is $Ni_{0.5}Zn_{0.5}Fe_2O_4$, a metal, ferrite, a rare earth metal, a semiconductor, a metal oxide, a clay, or an organic particle. In some implementations the first filler comprises a nanoparticle between 1 and 50 nm in diameter. In some implementations the filler particles are between 50 and 3000 nm in diameter. In some implementations the structural material comprises polyamide, acrylonitrile butadiene styrene, styrene, polycarbonate, polypropylene, tricyclo-decanedimethanol-diacrylate, neopentyl glycol diacrylate, diethylene glycol diacrylate, and/or 1,6-hexanediol diacrylate with mercaptoesters. In some implementations the lattice material and the structural material are distributed within a plurality of unit cells. In some implementations the structural material has a second filler with a concentration of nanoparticles at least an order of magnitude less than the concentration of nanoparticles in the lattice material. In some implementations at least one of the plurality of unit cells is completely encapsulated by the structural material, and the lattice material it is not in direct physical contact with the lattice material of a neighboring unit cell. In some implementations no linear axis through the article comprises a single composition of material. In some implementations a plurality of volumetric unit-cell shapes are formed. In some implementations the lattice material has a plurality of compositions. In some implementations the unit cells form an anisotropic grid within the article. In some implementations, during deposition the concentration of the first filler within the plurality of unit cells varies as a function of location within at least one of the plurality of unit cells. In some implementations the concentration of fillers within the unit cells varies as a function of location within at least one unit cell by more than 5 percent. In some implementations the concentration of fillers within the unit cells varies as a function of location within the unit cells of the article by more than 5 percent. In some implementations a plurality of unit cells is deposited with periodicity in at least one plane. In some implementations the unit cells are three-dimensionally periodic. In some implementations the unit cells are random, aperiodic, Penrose, or fractal 3D tiling. In some implementations the unit cells are uniformly shaped. In some implementations volumetric unit cells are shaped as one or more shapes including a sphere, cone, cylinder, cube, tetrahedron, cuboid, helix, dodecahedron, icosahedron, torus, triangular prism, octahedron, ellipsoid, square pyramid, hexagonal prism, pentagonal prism, pentagonal pyramid, hexagonal pyramid, octagonal pyramid, fractal, or random shaped cells, or a combination thereof. In some implementations at least one of the unit cells are chamfered or have rounded edges. In some implementations unit cells vary in size, shape, and orientation. In some implementations the method further comprises an intermittent curing process during deposition. In some implementations curing is performed using optical radiation from one or more laser beams. In some implementations curing is performed on each layer, before the next layer is deposited. In some implementations curing is performed on a portion of the article before a layer is completed. In some implementations the structural matrix has a second filler. In some implementations the second filler is a ceramic or metal. In some implementations the lattice material is interconnected through gaps in the structural material. In some implementations the structural material thickness changes throughout the lattice material. In some implementations the lattice material has a varying concentration of the first filler. In some implementations the plurality of units cells are deposited with varying first filler material composition. In some implementations thermal stress due to CTE mismatch is ameliorated with small-geometry unit cells to reduce differential expansion strain. In some implementations thermal stress due to CTE mismatch is ameliorated with the randomized or fractal pattern unit cell shapes.

It will be understood that the configurations and/or approaches described herein are exemplary in nature, and that these specific examples are not to be considered in a limiting sense, because numerous variations are possible. The specific routines or methods described herein may represent one or more of any number of processing strategies. As such, various acts illustrated and/or described may be conducted in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of additive manufacture of an article, the method comprising:
    printing a first series of voxels of a consumable lattice material in a pattern corresponding to a unit-cell portion of a layer of the article, the consumable lattice material including a host material and a nanoparticle filler;
    printing a second series of voxels of a consumable structural material in a pattern corresponding to an encasing-matrix portion of a layer of the article, wherein a loading of the nanoparticle filler of the consumable lattice material exceeds a loading of nanoparticle filler of the consumable structural material, and wherein the consumable structural material has greater mechanical strength than the consumable lattice material; and
    curing the first and second series of voxels.

2. The method of claim 1 wherein the nanoparticle filler of the consumable lattice material includes metal nanoparticles, metal-oxide nanoparticles, semiconductor nanoparticles, ceramic nanoparticles, ferromagnetic nanoparticles, polymer nanoparticles, dye, pigment nanoparticles, fullerenes, and/or nanotubes.

3. The method of claim 1, wherein the nanoparticle filler of the consumable lattice material includes nanoparticles shaped as rods, fibers, spheres, plates, and/or polyhedrons.

4. The method of claim 1, wherein the nanoparticle filler comprises $Ni_{0.5}Zn_{0.5}Fe_2O_4$ particles of 50 to 70 nm in diameter.

5. The method of claim 1, wherein the host material and the nanoparticle filler of the consumable lattice material differ with respect to dielectric constant, dielectric strength, impedance, dielectric loss, permeability, permittivity, magnetic moment, color, index of refraction, electrical conductivity, and/or thermal conductivity.

6. The method of claim 1, further comprising printing a third series of voxels of the consumable structural material corresponding to a surface layer of the article.

7. The method of claim 1, wherein the pattern corresponding to the unit-cell portion includes fused, contiguous unit cells.

8. The method of claim 1, wherein the pattern corresponding to the encasing-matrix portion comprises a series of partitions that separate adjacent unit cells of the unit-cell portion.

9. The method of claim 1, wherein the pattern corresponding to the unit-cell portion defines a plurality of unit cells each larger by an order of magnitude than any voxel of the first series of voxels.

10. The method of claim 1, wherein the pattern corresponding to the unit-cell portion includes a gradation of nanoparticle-filler concentration maximal at a center of a given unit cell and decreasing on a path approaching the encasing-matrix portion.

11. An additively manufactured article based on a plurality of printed voxels, the article comprising:
a printed and cured lattice of unit cells of a consumable lattice material, the printed and cured lattice including a first series of voxels of the consumable lattice material in a pattern corresponding to a unit-cell portion of a layer of the article, the consumable lattice material including a host material and a nanoparticle filler; and
a printed and cured encasing matrix of a consumable structural material arranged between adjacent unit cells of the printed and cured lattice, the printed and cured encasing matrix including a second series of voxels of the consumable structural material in a pattern corresponding to an encasing-matrix portion of a layer of the article, wherein a loading of the nanoparticle filler of the consumable lattice material exceeds a loading of nanoparticle filler of the consumable structural material, and wherein the consumable structural material has greater mechanical strength than the consumable lattice material.

12. The article of claim 11, wherein the nanoparticle filler of the consumable lattice material includes metal nanoparticles, metal-oxide nanoparticles, semiconductor nanoparticles, ceramic nanoparticles, ferromagnetic nanoparticles, polymer nanoparticles, dye, pigment nanoparticles, fullerenes, and/or nanotubes.

13. The article of claim 11, wherein the nanoparticle filler of the consumable lattice material includes nanoparticles shaped as rods, fibers, spheres, plates, and/or polyhedrons.

14. The article of claim 11, wherein the nanoparticle filler of the consumable lattice material comprises $Ni_{0.5}Zn_{0.5}Fe_2O_4$ particles of 50 to 70 nm in diameter.

15. The article of claim 11, wherein the host material and the nanoparticle filler of the consumable lattice material differ with respect to dielectric constant, dielectric strength, impedance, dielectric loss, permeability, permittivity, magnetic moment, color, index of refraction, electrical conductivity, and/or thermal conductivity.

16. The article of claim 11, further comprising printing a third series of voxels of the consumable structural material corresponding to a surface layer of the article.

17. The article of claim 11, wherein the pattern corresponding to the unit-cell portion includes fused, contiguous unit cells.

18. The article of claim 11, wherein the pattern corresponding to the encasing-matrix portion comprises a series of partitions that separate adjacent unit cells of the unit cell portion.

19. The article of claim 11, wherein the pattern corresponding to the unit-cell portion defines a plurality of unit cells each larger by an order of magnitude than any voxel of the first series of voxels.

20. The article of claim 11, wherein the pattern corresponding to the unit-cell portion includes a gradation of nanoparticle-filler concentration maximal at a center of a given unit cell and decreasing on a path approaching the encasing-matrix portion.

* * * * *